(12) United States Patent
Kil et al.

(10) Patent No.: US 9,857,262 B2
(45) Date of Patent: Jan. 2, 2018

(54) APPARATUS FOR SELF-INSPECTING WATERPROOF FUNCTION

(71) Applicant: Samsung Electronics Co., Ltd., Gyeonggi-do (KR)

(72) Inventors: Kwang-Min Kil, Gyeonggi-do (KR); Jae-Sung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/792,173

(22) Filed: Jul. 6, 2015

(65) Prior Publication Data

US 2016/0005296 A1 Jan. 7, 2016

(30) Foreign Application Priority Data

Jul. 4, 2014 (KR) .................. 10-2014-0083963

(51) Int. Cl.
| | | |
|---|---|---|
| G08B 21/00 | (2006.01) | |
| G01M 3/00 | (2006.01) | |
| G08B 21/20 | (2006.01) | |
| G01M 3/24 | (2006.01) | |
| G01M 3/32 | (2006.01) | |

(52) U.S. Cl.
CPC .............. *G01M 3/002* (2013.01); *G01M 3/24* (2013.01); *G01M 3/3263* (2013.01); *G08B 21/20* (2013.01)

(58) Field of Classification Search
None
See application file for complete search history.

(56) References Cited

U.S. PATENT DOCUMENTS

| | | | | |
|---|---|---|---|---|
| 4,370,764 A | * | 2/1983 | Ando ................ | E03D 9/08 4/420.2 |
| 2009/0164148 A1 | * | 6/2009 | Shinoda ............. | G01M 3/26 702/45 |
| 2015/0150479 A1 | * | 6/2015 | Yoshino ............. | A61B 5/0537 600/547 |
| 2016/0239047 A1 | * | 8/2016 | Weber ............... | G06F 1/1656 |

FOREIGN PATENT DOCUMENTS

| | | |
|---|---|---|
| JP | 2009-121965 | 6/2009 |
| JP | 2009121965 | * 6/2009 |

* cited by examiner

*Primary Examiner* — Adolf Dsouza
(74) *Attorney, Agent, or Firm* — The Farrell Law Firm, P.C.

(57) ABSTRACT

A electronic device and method for self-inspecting a waterproof function of the electronic device are provided. The electronic device includes a first sensor for sensing an external condition of the electronic device; a second sensor, which is sealed within the electronic device, for sensing an internal condition of the electronic device; and a controller for comparing values of the external condition and the internal condition sensed by the first sensor and the second sensor, respectively, and determining a status of the waterproof function of the electronic device, based on the comparison.

21 Claims, 4 Drawing Sheets

APPARATUS FOR SELF-INSPECTING WATERPROOF FUNCTION

PRIORITY

This application claims priority under 35 U.S.C. §119(a) to Korean Application Serial No. 10-2014-0083963, which was filed in the Korean Intellectual Property Office on Jul. 4, 2014, the entire disclosure of which is hereby incorporated by reference.

BACKGROUND

1. Field of the Invention

The present invention relates to an apparatus for self-inspecting a waterproof function, which is provided in an electronic device.

2. Description of the Related Art

One of the major causes of damage to electronic devices such as portable terminals, MPEG-1 audio layer-3 (MP3) players, Portable Multimedia Players (PMPs), tablets, Personal Computers (PCs), smartphones, etc., is water. Accordingly, the popularity of waterproof electronic devices has grown recently.

To test a waterproof function, i.e., the effectiveness of the waterproofing, of an electronic device, a conventional apparatus for inspecting a waterproof function has a chamber including an installation space, in which an electronic device is installed. Thereafter, the pressure in the chamber is increased, and the state of the electronic terminal is monitored. If the electronic device is contracts as the pressure is increased, then the waterproof function of the electronic device is good. However, if the electronic device is not deformed, i.e., does not contract, as the pressure is increased, then the waterproof function of the electronic device has a problem.

Generally, the conventional apparatus for inspecting a waterproof function of the electronic device includes the chamber for generating pressure, a sensor for detecting deformation, i.e., expansion or contraction, of the electronic device in the chamber as pressure is applied, a controller for adjusting pressure of the chamber, and a monitor for displaying waterproof inspection items, e.g., sensor readings.

However, the conventional apparatus for inspecting a waterproof function of an electronic device is a separate measurement apparatus, which increases cost and time to properly inspect a waterproof function of an electronic device, thereby inhibiting production of the electronic device.

SUMMARY

The present invention has been made to address at least the problems and/or disadvantages described above and to provide at least the advantages described below.

Accordingly, an aspect of the present invention to provide a system and method for a user to measure a waterproof function of an electronic device, without using a separate measurement apparatus.

Another aspect of the present invention is to provide an apparatus and method in which a waterproof function of an electronic device can be self-inspected, without using a separate external waterproof function inspection apparatus.

Another aspect of the present invention is to provide an apparatus and method for inspecting a waterproof function, by providing an electronic device with a plurality of sensors for measuring external and internal pressures, temperatures, sounds, etc., wherein differences between the external and internal pressures, temperatures, sounds, etc., are displayed on a display of the electronic device in real time to be monitored, such that a waterproof function of the electronic device can be determined from the differences.

In accordance with an aspect of the present invention, an electronic device is provided that self-inspects a waterproof function of the electronic device. The electronic device includes a first sensor for sensing an external condition of the electronic device; a second sensor, which is sealed within the electronic device, for sensing an internal condition of the electronic device; and a controller for comparing values of the external condition and the internal condition sensed by the first sensor and the second sensor, respectively, and determining a status of the waterproof function of the electronic device, based on the comparison.

In accordance with another aspect of the present invention, an electronic device is provided that self-inspects a waterproof function of the electronic device. The electronic device includes an electronic device body comprising an opening; a first sensor provided in the opening of the electronic device body; a second sensor provided in a sealed interior of the electronic device body; and a controller for comparing a value sensed by the first sensor and a value sensed by the second sensor, and determining a status of the waterproof function of the electronic device, based on the comparison.

In accordance with another aspect of the present invention, a method is provided for self-inspecting a waterproof function of an electronic device. The method includes sensing, by a first sensor, an external condition of the electronic device; sensing, by a second sensor, which is sealed within the electronic device, an internal condition of the electronic device; comparing values of the external condition and the internal condition sensed by the first sensor and the second sensor, respectively; and determining a status of the waterproof function of the electronic device, based on the comparison.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
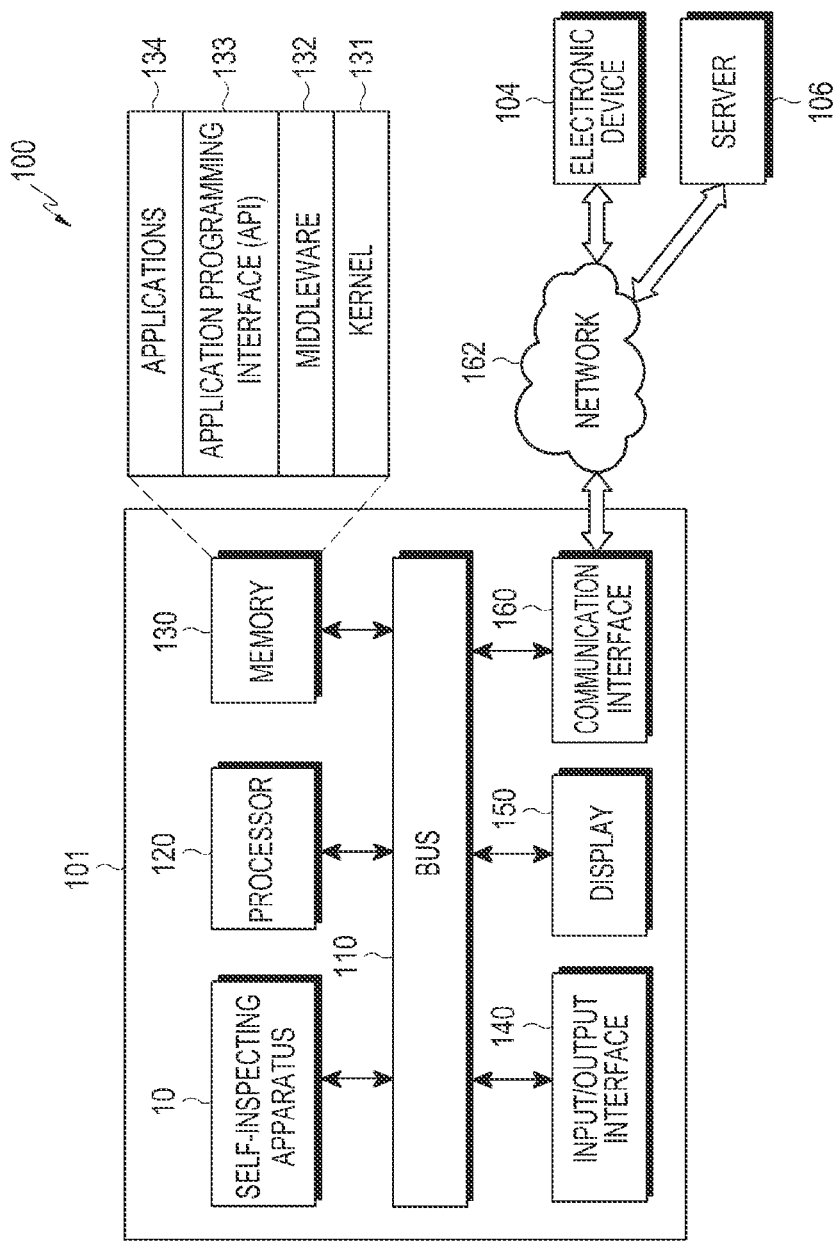
FIG. 1 illustrates a network environment including an electronic device according an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

With respect to the terms in the various embodiments of the present invention, the general terms which are currently and widely used are selected in consideration of functions of structural elements in the various embodiments of the present invention. However, meanings of the terms may be changed according to user's intention, a judicial precedent, appearance of a new technology, etc. Further, in certain cases, terms arbitrarily selected by the applicant may be used. In such a case, a meaning of a term will be described in detail at the corresponding part in the description of the present invention. Thus, the terms used in various embodiments of the present invention should be defined based on the meanings of the terms and the overall contents of the embodiments of the present invention instead of simple titles of the terms.

Although the terms including an ordinal number such as first, second, etc., may be used for describing various elements, the structural elements are not restricted by the terms. The terms are only used to distinguish one element from another element. For example, without departing from the scope of the present invention, a first structural element may be referred to as a second structural element. Similarly, the second structural element also may be referred to as the first structural element.

Herein, an electronic device may include all information/communication devices and multimedia devices such as a video phone, an e-book reader, a laptop PC, a netbook computer, a Personal Digital Assistant (PDA), a PMP, an MP3 player, a mobile medical instrument, a camera, a wearable device (for example, a Head-Mounted Device (HMD), such as electronic glasses), electronic clothes, an electronic bracelet, an electronic necklace, an electronic appcessory, an electronic tattoo, or a smart watch and application devices thereof, including all mobile communication terminals operated based on communication protocols corresponding to various communication systems.

According to some embodiments, the electronic device may be a smart home appliance. For example, the smart home appliance may include at least one of a television (TV), a digital video disk (DVD) player, an audio, a refrigerator, an air conditioner, a vacuum cleaner, an oven, a microwave oven, a washing machine, an air cleaner, a set-top box, a TV box (e.g., Samsung HomeSync®, Apple TV®, or Google TV®), a game console, an electronic dictionary, an electronic key, a camcorder, and an electronic photo frame.

According to some embodiments, the electronic device may include at least one of various medical appliances (e.g., a magnetic resonance angiography (MRA) machine, a magnetic resonance imaging (MRI) machine, a computed tomography (CT) machine, or an ultrasonic machine), navigation equipment, a global positioning system (GPS) receiver, an event data recorder (EDR), a flight data recorder (FDR), automotive infotainment device, electronic equipment for ships (e.g., ship navigation equipment and a gyrocompass), avionics equipment, security equipment, a vehicle head unit, an industrial or home robot, an automatic teller machine (ATM), and a point of sales (POS) device of a retail shop.

According to some embodiments, the electronic devices may include at least one of furniture or a part of a building/structure having a communication function, electronic boards, electronic signature receiving devices, projectors, or various measuring equipment (e.g., equipment for supplying water, electricity, gas, or radio waves).

According to some embodiments, an electronic device may be a flexible device.

According to some embodiments, an electronic device may be a combination of one or more of above described various devices. Also, electronic devices according to the various embodiments of the present invention are not limited to the above-described devices.

FIG. 1 illustrates a network environment including an electronic device according to an embodiment of the present invention.

Referring to FIG. 1, an electronic device 101 includes a self-inspecting apparatus 10, a bus 110, a processor 120, a memory 130, an input/output interface 140, a display 150, and a communication interface 160. The bus 110 may be a circuit for connecting components elements of the electronic device 101, i.e., the self-inspecting apparatus 10, the processor 120, the memory 130, the input/output interface 140, the display 150, and the communication interface 160, and for transferring communication, for example, a control message, between the component elements.

The processor 120 may, for example, receive a command from one of the other component elements through the bus 110, decrypt the received instructions, and execute an operation or data processing based on the decrypted instructions.

The memory 130 stores commands or data received from or generated by the other elements. For example, the memory 130 includes programming modules including a kernel 131, a middle ware 132, an Application Programming Interface (API) 133, and an application 134. Each of the programming modules may be formed of software, firmware, or hardware, or a combination of two or more thereof.

The kernel 131 controls or manages system resources, for example, the bus 110, the processor 120, the memory 130, etc., used for executing an operation or function implemented in other programming modules, for example, the middle ware 132, the API 133, or the application 134. The kernel 131 also provides an interface that enables the middle ware 132, the API 133, or the application 134 to access an individual component element of the electronic device 101 for control or management.

The middle ware 132 operates as a relay so that the API 133 or the application 134 executes communication with the kernel 131, and may receive and transmit data. Further, in association with operation requests received from the application 134, the middle ware 132 may execute a control (e.g., scheduling or load balancing) for an operation request, using of for example, a method of assigning, to at least one of application 134, a priority for use of a system resource (e.g., for example, the bus 110, the processor 120, the memory 130, etc.) of the electronic device 101.

The API 133 is used by the application 134 to control a function provided from the kernel 131 or the middle ware 132, and may include, for example, at least one interface or function, such as an instruction, for a file control, a window control, image processing, a character control, etc.

For example, the applications 134 may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, etc.).

Additionally or alternatively, the applications 134 may include an application associated with exchanging information between the electronic device 101 and an external electronic device 104. The application associated with exchanging information may include, for example, a notification relay application for transferring predetermined information to the external electronic device 104 or a device management application for managing the external electronic device 104.

For example, the notification relay application may include a function of transferring, to the external electronic device 104, notification information generated from other applications of the electronic device 101, such as an SMS/MMS application, an e-mail application, a health management application, an environmental information application, etc.

Additionally or alternatively, the notification relay application may receive notification information from the electronic device 104, and may provide the notification information to a user.

The device management application may manage (for example, install, delete, or update), for example, a function of at least a part of the electronic device 104 that communicates with the electronic device 101 (for example, activating/deactivating the external electronic device (or a few component elements) or adjusting brightness (or resolution) of a display), an application operated in the external electronic device, or a service provided from the external electronic device 104, such as a call service or a message service.

The application 134 may include an application designated according to properties (e.g., a type) of the electronic device 104. For example, when the external electronic device 104 is an MP3 player, the applications 134 may include an application related to the reproduction of music. Similarly, when the external electronic device 104 is a mobile medical device, the applications 134 may include an application related to health care.

The applications 134 may include at least one of an application received from an application designated for the electronic device 101 or an application received from a server 106 or the electronic device 104.

The input/output interface 140 transfers a command or data input by a user through an input/output device (for example, a sensor, a keyboard, or a touch screen) to the processor 120, the memory 130, and the communication interface 160, through the bus 110. For example, the input/output interface 140 may provide the processor 120 with data associated with a touch of a user input through a touch screen. The input/output interface 140 may output, for example, command or data received through the bus 110 from the processor 120, the memory 130, and the communication interface 160, to an input/output device (for example, a speaker or display). The input/output interface 140 may include an audio module. An audio unit such as earphones, headphones, or a headset may also be connected to the audio module.

The display 150 displays various information (e.g., multimedia data, text data, etc.) to a user.

The communication interface 160 connects the electronic device 101 to the electronic device 104 and/or the server 106. For example, the communication interface 160 may be connected to the network 162 through wireless communication or wired communication, and may communicate with an external device. Wireless communication may include at least one of, for example, Wireless Fidelity (Wifi), Bluetooth® (BT), Near Field Communication (NFC), GPS and cellular communication (for Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), etc.). The wired communication may include at least one of, for example, a Universal Serial Bus (USB), a High Definition Multimedia Interface (HDMI), a Recommended Standard 232 (RS-232), and a Plain Old Telephone Service (POTS).

The network 162 may be a communication network. The communication network may include at least one of a computer network, the Internet, the Internet of things, and a telephone network. A protocol for communication between the electronic device 101 and the external electronic device 104 (for example, a transport layer protocol, a data link layer protocol, or a physical layer protocol) may be supported in at least one of the applications 134, the API 133, the middle ware 132, the kernel 131, and the communication interface 160.

Figure 3:
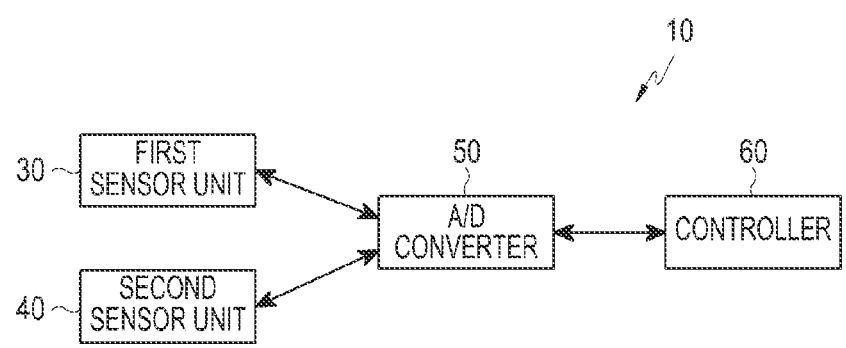
FIG. 3 illustrates an apparatus for self-inspecting a waterproof function according to an embodiment of the present invention.

The processor 120 and the memory 130 for storing information required by the processor 120 may be included in a controller 60 (e.g., as illustrated in FIG. 3), i.e., a central processing unit, which controls an overall operation of the electronic device 101. As will be described below, in with reference to FIG. 3, the controller 60 may perform an operation for the self-inspecting apparatus 10 for self-inspecting a waterproof function.

Although the description below is made with reference to the electronic device 101 self-inspecting a waterproof function thereof, the present disclosure is not limited thereto. That is, an apparatus for self-inspecting a waterproof function may be applied to any other product that requires a waterproof function in various modified embodiments of the present invention. For example, the other product may be a watch, a cosmetic product, a window, and a water cup.

Figure 2:
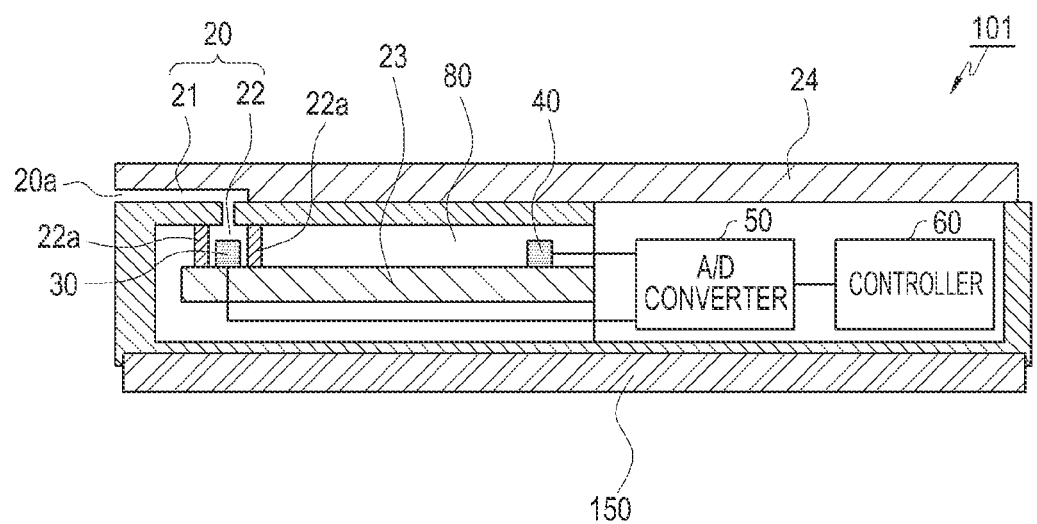
FIG. 2 illustrates a side view of an electronic device, which is capable of self-inspecting a waterproof function of the electronic device, according to an embodiment of the present invention.

FIG. 2 illustrates a side view of an electronic device, which is capable of self-inspecting a waterproof function of the electronic device, according to an embodiment of the present invention.

Referring to FIG. 2, the electronic device 101 includes an electronic device body 20, first and second sensors 30 and 40, an Analog to Digital (A/D) converter 50, and a controller 60. The first and second sensors 30 and 40, the A/D converter 50, and the controller 60 may be collectively referred to as the self-inspecting apparatus 10, as illustrated in FIG. 3.

The electronic device body 20 includes an opening 20a that exposes the first sensor 30 to external conditions of the electronic device 101, and includes a closed space 80, in which the second sensor 40 is sealed, preventing the second sensor 40 from exposure to the external conditions of the electronic device 101.

For example, the first sensor 30 provided in the electronic device body 20 senses an external pressure of the electronic device 101 through the opening 20a, and the second sensor 40 provided in the closed space 80 of the electronic device body 20 senses an internal pressure of the electronic device body 20.

The A/D converter 50 converts analog signals measured by the first and second sensors 30 and 40 into digital signals.

The controller 60 receives the digital signals of the A/D converter 50, compares the values of the external and internal pressures, the temperatures, the sounds, etc., sensed by the first and second sensors 30 and 40. Based on the comparison, the controller 60 determines a status of a waterproof function of the electronic device 101 and displays the status of the waterproof function on the display 150 provided in the electronic device 101.

The display 150 displays wordings, symbols, and icons, and may periodically display records on the waterproof function of the electronic device. For example, the display may display various different shapes in addition to the wordings, the symbols, and icons.

For example, the first and second sensors 30 and 40 may be pressure sensors, temperature sensors, and/or sound sensors for detecting pressure, temperature, and/or sounds. Although the embodiments of the present invention are described herein using pressure sensors by way of example, the first and second sensors 30 and 40 may also include other sensors such as optical sensors. Accordingly, the first and second sensors 30 and 40 sense external and internal pressures, respectively, of the electronic device 101.

Specifically, the sealed (waterproofed) electronic device 101 experiences a difference between external and internal pressures. By providing the electronic device 101 with the first and second sensors 30 and 40 for respectively sensing the external and internal pressures and also providing the controller 60 for displaying the pressure difference sensed by the first and second sensors 30 and 40 on the display 150 of the electronic device 101, the controller 60 can continuously monitor the external and internal pressures of the electronic device 101. If the pressures are the same, the controller 60 determines that the waterproof function of the electronic device 101 is abnormal, and if the pressures are different, the controller 60 determines that the waterproof function of the electronic device 101 is normal.

Accordingly, because the waterproof function of the electronic device 101 can be self-inspected without using a separate external self-inspection apparatus, a user can easily monitor the waterproof function of the electronic device 101 in real time, thereby preventing damage due to introduction of moisture into the electronic device 101 when the waterproof function of the electronic device has failed, and better protecting the electronic device 101.

When the external and internal pressures sensed by the first and second sensors 30 and 40, respectively, are the same, the controller 60 determines that the waterproof function of the electronic device body 20 is abnormal and displays a warning on the display 150 of the electronic device body 20 to inform a user of the abnormal state.

Additionally, when the waterproof function of the electronic device body 20 is abnormal, even of the user fails to recognize the abnormal state, the controller 60 may switch off power of the electronic device to possibly protect the electronic device 101, e.g., if the electronic device 101 is used underwater.

When the external and internal pressures sensed by the first and second sensors 30 and 40, respectively, are different, the controller 60 determines that the waterproof function of the electronic device body 20 is normal and may display an indication, e.g., wordings and/or icons, on the display 150 of the electronic device 101 to inform the user of the normal state.

At the same time, the controller 60 maintains the power of the electronic device 101 since the waterproof function of the electronic device body 20 is normal. The opening 20a may be formed on a side surface of a cover 24 provided in the electronic device body 20. The opening 20a may also be formed on upper and lower surfaces of the cover 24.

The electronic device body 20 includes a guide 21 connected to the opening 20a, for guiding introduction of an external pressure.

A sensor positioning part 22 is connected to the guide 21 such that the first sensor 30 is positioned on the sensor positioning part 22. That is, the guide 21 guides a pressure introduced through the opening 20a to the sensor positioning part 22, and allows the first sensor 30 to sense the pressure.

Further, the sensor positioning part 22 includes a plurality of partition walls 22a, which may be provided on a printed circuit board 23 included in the electronic device body 20. That is, the partition walls 22a are provided around the guide 21, and are integrally formed with a rear surface of the cover 24 to face the upper surface of the printed circuit board 23. Basically, the partition walls 22a are provided around the first sensor 30 provided in the printed circuit board 23 to shield the first sensor 30 from the electronic device body 20.

The display 150, as illustrated in FIG. 1, may be any one of a touch screen, a Liquid Crystal Display (LCD), and a touch panel, but the present disclosure is not limited thereto. Any other display that can display a function of the electronic device 101 may be applied in various modified embodiments of the present invention.

Figure 4A:
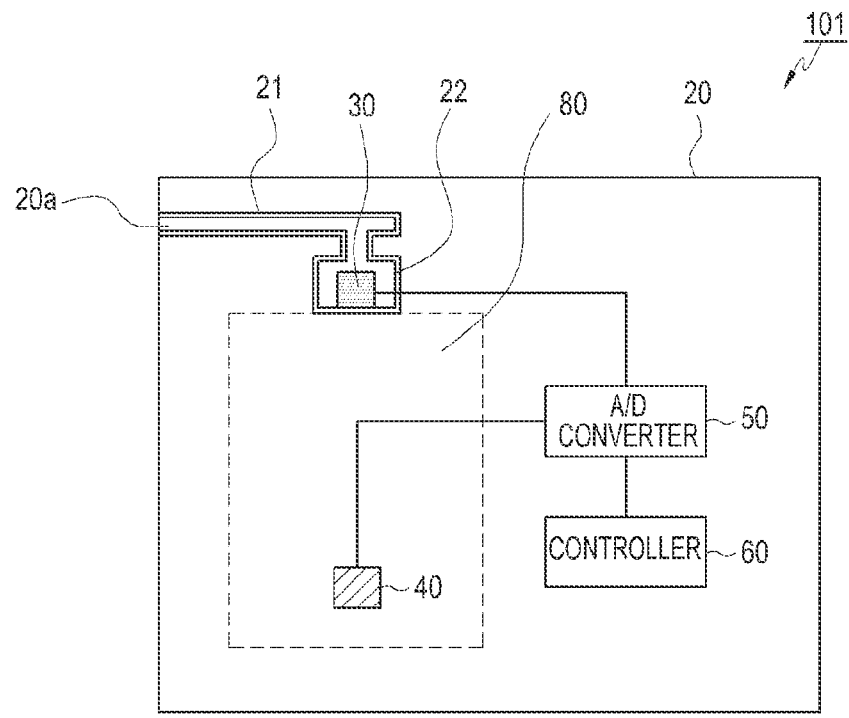
FIG. 4A illustrates an abnormal state of a waterproof function detected by an apparatus for self-inspecting the waterproof function according to an embodiment of the present invention.
Figure 4B:
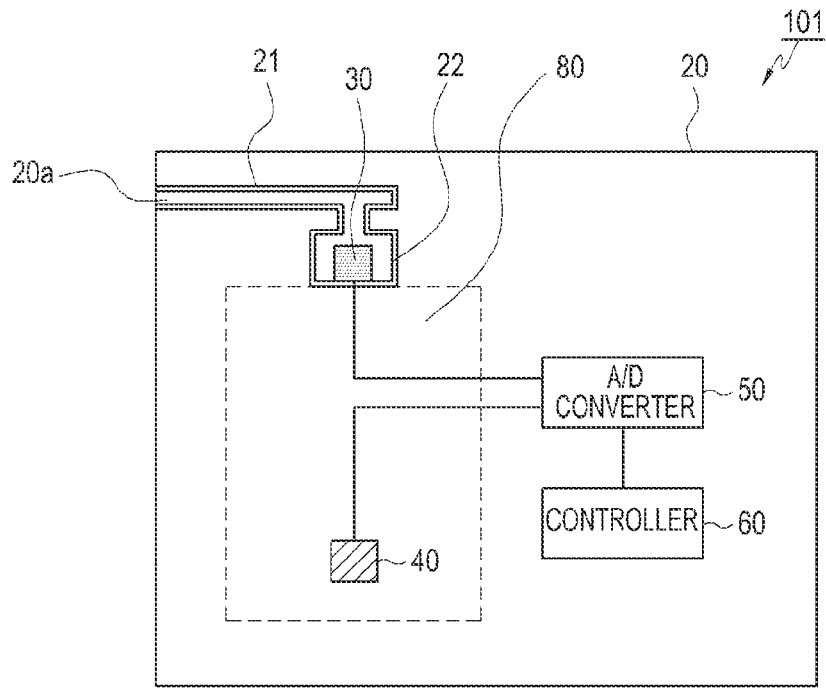
FIG. 4B illustrates a normal state in which of a waterproof function detected by an apparatus for self-inspecting the waterproof function according to an embodiment of the present invention.

FIG. 4A illustrates an abnormal state of a waterproof function detected by an apparatus for self-inspecting the waterproof function according to an embodiment of the present invention, and FIG. 4B illustrates a normal state of a waterproof function detected by an apparatus for self-inspecting the waterproof function according to an embodiment of the present invention.

Referring to FIG. 4A, to inspect a waterproof function of the electronic device 101, a pressure corresponding to 1 kg is applied to the front surface of the electronic device 101. Here, a weight force applied to the front surface of the electronic device 101 may be more or less than 1 kg.

When the waterproof function of the electronic device 101 is abnormal, e.g., due to an opening of the closed space 80, an external pressure sensed by the first sensor 30 is 1015 hPa (hPa refers to a unit (Hector-Pascal) of atmospheric pressure) and an internal pressure sensed by the second sensor 40 is 1015 hPa, which is the same as the pressure sensed by the first sensor 30. The same external and internal pressures sensed by the first and second sensors 30 and 40 are converted into digital signals through the A/D converter 50 and are applied to the controller 60. The controller 60 determines that the external and internal pressures respectively sensed by the first and second sensors 30 and 40 are the same and displays the result on the display 150 of the electronic device body 20. That is, the controller 60 detects the abnormal condition from the sensed pressures and then displays, e.g., using an icon, that the waterproof function of the electronic device 101 is abnormal.

Referring to FIG. 4B, the waterproof function of the electronic device 101 is normal, e.g., the closed space 80 is still sealed, when an external pressure sensed by the first sensor 30 is 1015 hPa and an internal pressure sensed by the second sensor 40 is 1030 hPa, i.e., are different. That is, because the external and internal pressure values sensed by the first and second sensors 30 and 40, respectively, are different, the controller 60 identifies that the interior of the electronic device 101 is sealed.

When the electronic device body 20 of the electronic device 101 is sealed, the electronic device 101 is considered waterproofed.

Again, after the controller 60 determines a difference between the sensed values of the first and second sensors 30 and 40, respectively, the controller 60 may displays an indication that the waterproof function of the electronic device 101 is normal.

The controller 60 may continuously monitor the first and second sensors 30 and 40 in order to identify if a common pressure is generated, and accordingly, can self-inspect the waterproof function of the electronic device 101.

In accordance with another embodiment of the present invention, the first and second sensor are sound sensors for measuring sounds.

Figure 5:
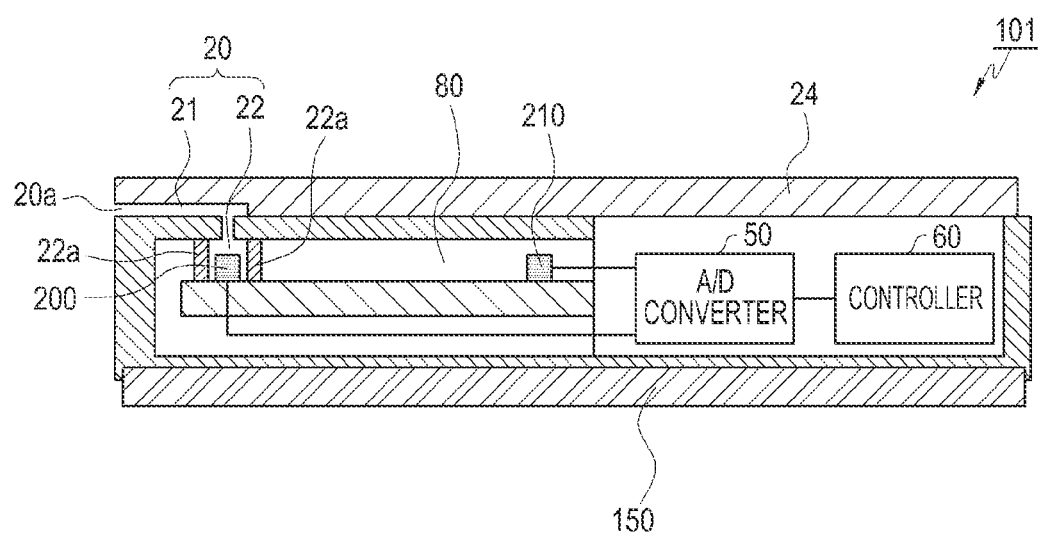
FIG. 5 illustrates a side view of an electronic device, which is capable of self-inspecting a waterproof function of the electronic device, according to an embodiment of the present invention.

FIG. 5 illustrates a side view of an electronic device, which is capable of self-inspecting a waterproof function of the electronic device, according to an embodiment of the present invention. Notably, the electronic device 101 illustrated in FIG. 5 is the same as the electronic device 101 illustrated in FIG. 1, except for the use of first and second sensors 200 and 210 for measuring sound of instead of the first and second sensors 30 and 40 for measuring pressure. Accordingly, a repetitive description of the other components of the electronic device 101 will be omitted below.

Referring to FIG. 5, the first sensor 200, which is provided in the opening 20a, senses an external sound of the electronic device 101, and the second sensor 210, which is provided in the closed space 80 of the electronic device body 20, senses an internal sound of the electronic device 101.

Here, the sound values of the second sensor 210 are sent to the controller 60 in advance as an abnormal measurement value or a normal measurement value for the waterproof function of the electronic device 101.

For example, when the sound values sensed by the first and second sensor 200 and 210 are the same value of 20 dB (dB refers to a sound unit of decibel), the controller 60 determines that the waterproof function of the electronic device 101 is abnormal. In this state, if the external sound value of the first sensor 200 is measured to be 20 dB and the internal sound of the second sensor 210 is measured to be the same value of 20 dB, the controller 60, the controller 60 recognizes that the external and internal sounds of the first and second sensor 200 and 210 are the same and determines that the waterproof function of the electronic device 101 is abnormal.

Thereafter, the controller 60 informs the user that the waterproof function of the electronic device is abnormal.

However, when the sound values sensed by the first and second sensor 200 and 210, respectively, are different, the controller 60 determines that the waterproof function of the electronic device 101 is normal. In this state, if the external sound value of the first sensor 200 is measured to be 20 dB and the internal sound of the second sensor 210 is measured to be a different value of 0 dB, the controller 60 recognizes that the external and internal sounds of the first and second sensors 200 and 210 are different and determines that the waterproof function of the electronic device 101 is normal.

Again, the controller 60 may display an indication for informing the user that the waterproof function of the electronic device 101 is normal.

A similar method may be performed using measured internal and external temperatures in the same way as the measured sounds.

Accordingly, the controller 60 may continuously monitors the first and second sensors 200 and 210 to determine if a normal sound difference is maintained, and accordingly, can self-inspect the waterproof function of the electronic device 101 in real time.

As described above, in order to inspect a waterproof function of an electronic device according to the related art, a separate measurement apparatus is required, increasing costs and time required for testing and producing the electronic device.

Accordingly, by providing a sealed electronic device including a first sensor for measuring, e.g., an external pressure, and a second sensor for measuring, e.g., an internal pressure, using the fact that the external pressure and the internal pressure are different, a pressure change rate and a pressure due to an in-use pattern are compared by monitoring the difference between the external pressure and the internal pressure, so that a waterproof function of the electronic device can be self-inspected without using a separate apparatus for inspecting the waterproof function and the user can be provided with waterproof function inspection information.

According to various embodiments of the present disclosure, a production efficiency of a product can be improved and a problem in a waterproof function of an electronic device can be actively detected in order to protect the electronic device by providing a plurality of sensor in the electronic device for measuring external and internal pressures, and temperatures, and sounds on the electronic device. By monitoring differences between external and internal pressures, temperatures, and sounds of the electronic device in real time through the sensors, self-inspection of the waterproof function of the electronic device can be performed, without using a separate external waterproof inspection apparatus.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An electronic device that self-inspects a waterproof function of the electronic device, the electronic device comprising:
   a first sensor for sensing an external condition of the electronic device;
   a second sensor, which is sealed within the electronic device, for sensing an internal condition of the electronic device; and
   a controller for comparing the external condition and the internal condition sensed by the first sensor and the second sensor, respectively, and determining a status of the waterproof function of the electronic device, based on the comparison,
   wherein the electronic device comprises an opening and a guide connected to the opening, for guiding introduction of the external condition to the first sensor.

2. The electronic device of claim 1, wherein the controller determines the status of the waterproof function of the electronic device as normal, when values of the external condition and the internal condition sensed by the first sensor and the second sensor, respectively, are different; and
   wherein the controller determines the status of the waterproof function of the electronic device as abnormal, when the values of the external condition and the internal condition sensed by the first sensor and the second sensor, respectively, are the same.

3. The electronic device of claim 1, further comprising an analog to digital (A/D) converter for converting analog signals measured by the first sensor and the second sensor into digital signals, and providing the digital signals to the controller.

4. The electronic device of claim 1, wherein the internal condition and the external condition comprise at least one of pressure, temperature, and sound.

5. The electronic device of claim 1, further comprising a display for displaying an indication of the status of the waterproof function of the electronic device.

6. An electronic device that self-inspects a waterproof function of the electronic device, the electronic device comprising:
an electronic device body comprising an opening and a guide connected to the opening, for guiding introduction of the external condition to a first sensor;
the first sensor provided in the opening of the electronic device body for sensing an external condition of the electronic device;
a second sensor provided in a sealed interior of the electronic device body for sensing an internal condition of the electronic device; and
a controller for comparing the external condition and the internal condition sensed by the first sensor and the second sensor, respectively, and determining a status of the waterproof function of the electronic device, based on the comparison.

7. The electronic device of claim 6, wherein the opening is formed on a side surface of a cover provided in the electronic device body.

8. The electronic device of claim 6, wherein the electronic device body comprises:
a sensor positioning part connected to the guide such that the first sensor is positioned on the sensor positioning part.

9. The electronic device of claim 8, wherein the sensor positioning part comprises a plurality of partition walls provided on a printed circuit board including in the electronic device body.

10. The electronic device of claim 6, wherein each of the first sensor and the second sensor comprises at least one of a pressure sensor, a temperature sensor, a sound sensor, and an optical sensor.

11. The electronic device of claim 6, wherein the second sensor is provided in a sealed closed space included in the electronic device body.

12. The electronic device of claim 6, further comprising a display for displaying an indication of the status of the waterproof function of the electronic device.

13. The electronic device of claim 12, wherein the display comprises one of a touch screen, and a liquid crystal display (LCD).

14. The electronic device of claim 6, wherein the controller determines that the waterproof function of the electronic device is abnormal, when the values sensed by the first sensor and the second sensor are the same, and determines that the waterproof function of the electronic device body is normal, when the values sensed by the first sensor and the second sensor are different.

15. The electronic device of claim 6, wherein the controller switches off power of the electronic device when the waterproof function of the electronic device body is abnormal.

16. The electronic device of claim 6, further comprising an analog to digital (A/D) converter for converting analog signals measured by the first sensor and the second sensor into digital signals, and providing the digital signals to the controller.

17. A method for self-inspecting a waterproof function of an electronic device, the method comprising:
sensing, by a first sensor, an external condition of the electronic device;
sensing, by a second sensor, which is sealed within the electronic device, an internal condition of the electronic device;
comparing the external condition and the internal condition sensed by the first sensor and the second sensor, respectively; and
determining a status of the waterproof function of the electronic device, based on the comparison,
wherein the electronic device comprises an opening and a guide connected to the opening, for guiding introduction of the external condition to the first sensor.

18. The method of claim 17, wherein determining a status of the waterproof function comprises:
determining the status of the waterproof function of the electronic device as normal, when values of the external condition and the internal condition sensed by the first sensor and the second sensor, respectively, are different; and
determining the status of the waterproof function of the electronic device as abnormal, when the values of the external condition and the internal condition sensed by the first sensor and the second sensor, respectively, are the same.

19. The method of claim 17, wherein the internal condition and the external condition comprise at least one of pressure, temperature, and sound.

20. The method of claim 17, further comprising displaying an indication of the status of the waterproof function of the electronic device.

21. An apparatus that self-inspects a waterproof function, the apparatus comprising:
an apparatus body comprising an opening and a guide connected to the opening, for guiding introduction of an external condition of the apparatus;
a first sensor provided in the opening of the apparatus body for sensing the external condition;
a second sensor provided within the apparatus body for sensing an internal condition of the apparatus; and
a controller for comparing the external condition and the internal condition sensed by the first sensor and the second sensor, respectively, and determining a status of the waterproof function of the apparatus, based on the comparison.

* * * * *